(12) United States Patent
Kocarev et al.

(10) Patent No.: US 10,574,057 B2
(45) Date of Patent: Feb. 25, 2020

(54) BATTERY CONTROL METHODS AND CIRCUITS, AND ENERGY STORAGE TO GRID CONNECTION SYSTEMS

(71) Applicant: The Regents of the University of California, Oakland, CA (US)

(72) Inventors: Ljupco Kocarev, La Jolla, CA (US); Vladimir Zdraveski, Skopje (MK); Mirko Todorovski, Skopje (MK); Andrej Gajduk, Skopje (MK); Lasko Basnarkov, Skopje (MK)

(73) Assignee: The Regents of the University of California, Oakland, CA (US)

( * ) Notice: Subject to any disclaimer, the term of this patent is extended or adjusted under 35 U.S.C. 154(b) by 80 days.

(21) Appl. No.: 15/574,446

(22) PCT Filed: May 17, 2016

(86) PCT No.: PCT/US2016/032903
§ 371 (c)(1),
(2) Date: Nov. 15, 2017

(87) PCT Pub. No.: WO2016/187213
PCT Pub. Date: Nov. 24, 2016

(65) Prior Publication Data
US 2018/0138710 A1    May 17, 2018

Related U.S. Application Data

(60) Provisional application No. 62/163,800, filed on May 19, 2015.

(51) Int. Cl.
*H02J 3/32* (2006.01)
*B60L 50/50* (2019.01)
(Continued)

(52) U.S. Cl.
CPC ............... *H02J 3/32* (2013.01); *B60L 50/50* (2019.02); *G05F 1/66* (2013.01); *H02J 3/14* (2013.01);
(Continued)

(58) Field of Classification Search
None
See application file for complete search history.

(56) References Cited

U.S. PATENT DOCUMENTS 7,245,045 B2    7/2007    Strom et al.
2004/0051387 A1    3/2004    Lasseter et al.
(Continued)

OTHER PUBLICATIONS

K. Alam et al., "Measurement of power frequency with higher accuracy using pic microcontroller", Procedia Technology, vol. 10, pp. 849-855, 2013.

(Continued)

*Primary Examiner* — Cassandra F Cox
(74) *Attorney, Agent, or Firm* — Greer, Burns & Crain, Ltd.; Steven P. Fallon

(57) ABSTRACT

A method measures a power characteristic at the one or more storage batteries, and controls the one or more batteries to selectively act as a generator to supply power to the power grid or to act as a load to draw power from the power grid in response to a predetermined disturbance in the power characteristic being detected. A system includes a battery charging circuit, a battery to grid circuit and a controller that monitors a power characteristic at the one or more storage batteries, and controls the one or more batteries to selectively act as a generator to supply power to the power grid or to act as a load to draw power from the power grid in response to a predetermined disturbance in the power characteristic being detected.

19 Claims, 9 Drawing Sheets

(51) Int. Cl.
    *G05F 1/66*    (2006.01)
    *H02J 3/14*    (2006.01)
(52) U.S. Cl.
    CPC ..... *H02J 2003/143* (2013.01); *Y02B 70/3266* (2013.01); *Y04S 20/242* (2013.01)

(56) References Cited

U.S. PATENT DOCUMENTS

| | | | |
|---|---|---|---|
| 2006/0276938 A1* | 12/2006 | Miller | G06Q 50/06 700/295 |
| 2011/0025556 A1 | 2/2011 | Bridges et al. | |
| 2012/0161713 A1 | 6/2012 | Kim et al. | |

OTHER PUBLICATIONS

T. Athay et al., "A practical method for the direct analysis of transient stability", Power Apparatus and Systems, IEEE Transactions, No. 2, pp. 573-584, 1979.
G. Becker et al., "Robust performance of linear parametrically varying systems using parametrically-dependent linear feedback", Systems & Control Letters, vol. 23, No. 3, pp. 205-215, 1994.
S. Bruno et al., "Controlling transient stability through line switching", Innovative Smart Grid Technologies (ISGT Europe), 2012 3rd IEEE PES International Conference and Exhibition, pp. 1-7, 2012.
S. Deilami et al., "Real-time coordination of plug-in electric vehicle charging in smart grids to minimize power losses and improve voltage profile", Smart Grid, IEEE Transactions, vol. 2, No. 3, pp. 456-467, 2011.
J. Doyle, "Analysis of feedback systems with structured uncertainties", Control Theory and Applications, IEE Proceedings D, vol. 129, pp. 242-250, IET, 1982.
L. Drude et al., "Photovoltaics (pv) and electric vehicle-to-grid (v2g) strategies for peak demand reduction in urban regions in Brazil in a smart grid environment", Renewable Energy, vol. 68, pp. 443-451, 2014.
Z. Duan et al., "Forecasting plug-in electric vehicle sales and the diurnal recharging load curve", Smart Grid, IEEE Transactions, vol. 5, No. 1, pp. 527-535, 2014.
M. Ehsani et al., "Vehicle to grid services: Potential and applications", Energies, vol. 5, No. 10, pp. 4076-4090, 2012.
A. Fuchs et al., "Placement of hvdc links for power grid stabilization during transients", PowerTech, 2013 IEEE Grenoble, pp. 1-6, IEEE, 2013.
A. Gajduk et al., "Improving power grid transient stability by plug-in electric vehicles", New Journal of Physics, vol. 16, No. 11, p. 115011, 2014.
"Tesla's batteries could be bigger business than electric cars", The Guardian, May 7, 2015.
S. Han et al., "Development of short-term reliability criterion for frequency regulation under high penetration of wind power with vehicle-to-grid support", Electric Power Systems Research, vol. 107, pp. 258-267, 2014.
P. Ji et al., "Basin stability in complex oscillator networks", Nonlinear Dynamics of Electronic Systems, pp. 211-218, Springer, 2014.
W. Kempton et al., "Vehicle-to-grid power: battery, hybrid, and fuel cell vehicles as resources for distributed electric power in California", Institute of Transportation Studies, 2001.
W. Kempton et al., "Vehicle-to-grid power fundamentals: calculating capacity and net revenue", Journal of Power Sources, vol. 144, No. 1, pp. 268-279, 2005.
H. Liu et al., "Decentralized vehicle-to-grid control for primary frequency regulation considering charging demands", Power Systems, IEEE Transactions, vol. 28, No. 3, pp. 3480-3489, 2013.
J. Machowski et al., Power system dynamics: stability and control, John Wiley & Sons, 2011.
F. Mwasilu et al., Electric vehicles and smart grid interaction: A review on vehicle to grid and renewable energy sources integration, Renewable and Sustainable Energy Reviews, vol. 34, pp. 501-516, 2014.
"Tesla ventures into solar power storage for home and business", The New York Times, May 1, 2015.
Y. Ota et al., "Autonomous distributed v2g (vehicle-to-grid) satisfying scheduled charging", Smart Grid, IEEE Transactions, vol. 3, No. 1, pp. 559-564, 2012.
M. Pai, Energy function analysis for power system stability. Springer, 1989.
C. Pang et al., "Bevs/phevs as dispersed energy storage for v2b uses in the smart grid", Smart Grid, IEEE Transactions, vol. 3, No. 1, pp. 473-482, 2012.
N.S. Pearre et al., "Electric vehicles: How much range is required for a days driving?", Transportation Research Part C: Emerging Technologies, vol. 19, No. 6, pp. 1171-1184, 2011.
C.C. Penna et al., "Climate change and the slow reorientation of the American car industry (1979-2012): An application and extension of the dialectic issue lifecycle (dilc) model", Research Policy, 2014.
D.B. Richardson, "Electric vehicles and the electric grid: A review of modeling approaches, impacts, and renewable energy integration", Renewable and Sustainable Energy Reviews, vol. 19, pp. 247-254, 2013.
J.L. Rueda et al., "Hybrid approach for power system operational planning with smart grid and small-signal stability enhancement considerations", Smart Grid, IEEE Transactions, vol. 4, No. 1, pp. 530-539, 2013.
P. Sauer et al., "Power system steady-state stability and the load-flow jacobian", Power Systems, IEEE Transactions, vol. 5, No. 4, pp. 1374-1383, 1990.
B. Schafer et al., "Decentral smart grid control", New Journal of Physics, vol. 17, No. 1, p. 015002, 2015.
M.A. Sofia et al., "Control method for multi-microgrid systems in smart grid environmentstability, optimization and smart demand participation", Innovative Smart Grid Technologies (ISGT), 2012 IEEE PES, pp. 1-5, IEEE, 2012.
E. Sortomme et al., "Intelligent dispatch of electric vehicles performing vehicle-to-grid regulation", Electric Vehicle Conference (IEVC), 2012 IEEE International, pp. 1-6, IEEE, 2012.
Y. Sun et al., "A unified modeling and control of a multi-functional current source-typed converter for v2g application", Electric Power Systems Research, vol. 106, pp. 12-20, 2014.
T. Van Cutsem et al., "Structure preserving direct methods for transient stability analysis of power systems", Decision and Control, 1985 24th IEEE Conference, vol. 24, pp. 70-76, IEEE, 1985.
Blaine R. Copenheaver, International Search Report for Application No. PCT/US2016/032903, dated Aug. 18, 2016.

* cited by examiner

BATTERY CONTROL METHODS AND CIRCUITS, AND ENERGY STORAGE TO GRID CONNECTION SYSTEMS

PRIORITY CLAIM AND REFERENCE TO RELATED APPLICATIONS

This application claims priority under 35 U.S.C. § 119 and all applicable statues and treaties from prior U.S. provisional application No. 62/163,800, which was filed on May 19, 2015.

FIELD

A field of the invention is electrical power storage and power management. Example applications of the invention include vehicle battery and home battery to power grid connection systems.

BACKGROUND

Connections to the power grid have radically changed over the past decade to include hybrid and battery-powered vehicles with large batteries. In addition, large batteries are sometimes used with alternative energy sources, e.g., solar panels. Plans to use energy storage with alternative energy sources that connect to the power grid are of interest to reduce dependence upon fossil fuels. Home batteries are proposed to provide the ability to send power from an alternative energy source back into the grid, for example.

Recently, plug-in electric vehicles (PEV) have surged in popularity. Currently, most PEVs establish connection to the grid only to recharge their batteries. But PEVs can also behave as distributed energy generators in the so called vehicle-to-grid (V2G) mode. See, W. Kempton, J. Tomic, S. Letendre, A. Brooks, and T. Lipman, "Vehicle-to-grid power: battery, hybrid, and fuel cell vehicles as resources for distributed electric power in California," *Institute of Transportation Studies*, (2001). Researchers are exploring the capabilities of electric vehicles for peak power supply, renewable energy integration, regulation support and spinning reserve. Another group of research addresses novel applications such as reactive power compensation and current harmonic filtering. See, e.g. L. Drude, L. C. P. Junior, and R. Ruther, "Photovoltaics (pv) and electric vehicle-to-grid (v2g) strategies for peak demand reduction in urban regions in Brazil in a smart grid environment," Renewable Energy, vol. 68, pp. 443-451, (2014); S. Han and S. Han, "Development of short-term reliability criterion for frequency regulation under high penetration of wind power with vehicle-to-grid support," Electric Power Systems Research, vol. 107, pp. 258-267 (2014); S. Deilami, A. S. Masoum, P. S. Moses, and M. A. Masoum, "Real-time coordination of plug-in electric vehicle charging in smart grids to minimize power losses and improve voltage profile," *Smart Grid, IEEE Transactions on*, vol. 2, no. 3, pp. 456-467, (2011).

The power grid is one of the most complex systems that mankind has engineered. Because the grid has no storage, electricity production must be continuously managed to meet the fluctuating demand. If this balance between generation and consumption is not maintained at all times, the system variables will start to drift from their nominal values. The ability to maintain frequency and voltage at their scheduled voltage is referred to as stability of the power system. Small disturbances, such as incremental load changes, are area of interest for steady-state stability. On the other hand, transient stability deals with large disturbances such as short-circuits and line trips. As PEVs increase in popularity and many are plugged into the grid simultaneously, the steady-state stability becomes more difficult to manage.

Scientists and engineers are constantly looking for new ways to improve the power grid stability using the concept of smart grid: smart control, smart demand response, smart management of HVDC lines and smart topology control. See, e.g., J. L. Rueda, W. H. Guaman, J. C. Cepeda, I. Erlich, and A. Vargas, "Hybrid approach for power system operational planning with smart grid and small-signal stability enhancement considerations," *Smart Grid, IEEE Transactions on*, vol. 4, no. 1, pp. 530-539, (2013); A. Fuchs and M. Morari, "Placement of HVDC links for power grid stabilization during transients," in PowerTech (POWERTECH), 2013 IEEE Grenoble, pp. 1-6, IEEE, (2013).

The main issue with most smart approaches concerns difficulties introduced by the reliance on a centralized entity that manages and controls a series of devices. This is also true for most PEV applications that also propose aggregating a group of vehicles to facilitate management, which adds yet another layer of security and privacy concerns, latency related problems and high initial cost.

Recently, we have shown that transient stability can be improved with PEVs. A. Gajduk, M. Todorovski, J. Kurths, and L. Kocarev, "Improving power grid transient stability by plug-in electric vehicles," New Journal of Physics, vol. 16, no. 11, p. 115011 (Nov. 11, 2014). The control strategy proposed in this prior work of ours regulates power exchange between PEVs and the power grid, based on the average turbine speeds at conventional generators, in an effort to reduce the effects of large disturbances. The strategy modeled PEVs as loads. In certain moments their power may become negative and they will be perceived by the system as generators. It was shown that by regulating the power output of the PEVs, speed and voltage fluctuations during transients can be significantly reduced. Furthermore, the critical clearing time, that is the time to clear the fault which caused the disturbance, can be extended by 20 to 40%. This in turn yields a more robust power system.

SUMMARY OF THE INVENTION

A preferred embodiment of the invention is a method for regulating the power transfer between one of more storage batteries and a power grid. The method includes measuring a power characteristic at the one or more storage batteries, and controlling the one or more batteries to selectively act as a generator to supply power to the power grid or to act as a load to draw power from the power grid in response to a predetermined disturbance in the power characteristic being detected. The local characteristic measured is preferably local frequency at the one or more storage batteries and the predetermined disturbance comprises a frequency disturbance. The frequency disturbance is preferably determined as a function of the first derivative of the change in local frequency.

A preferred system connects one or more storage batteries to a power grid. The controller includes a battery charging circuit, a battery to grid circuit and a controller that monitors a power characteristic at the one or more storage batteries. The controller controls the one or more batteries to selectively act as a generator to supply power to the power grid or to act as a load to draw power from the power grid in response to a predetermined disturbance in the power characteristic being detected. The preferred system can be imple-

DETAILED DESCRIPTION OF THE PREFERRED EMBODIMENTS

Figure 1:
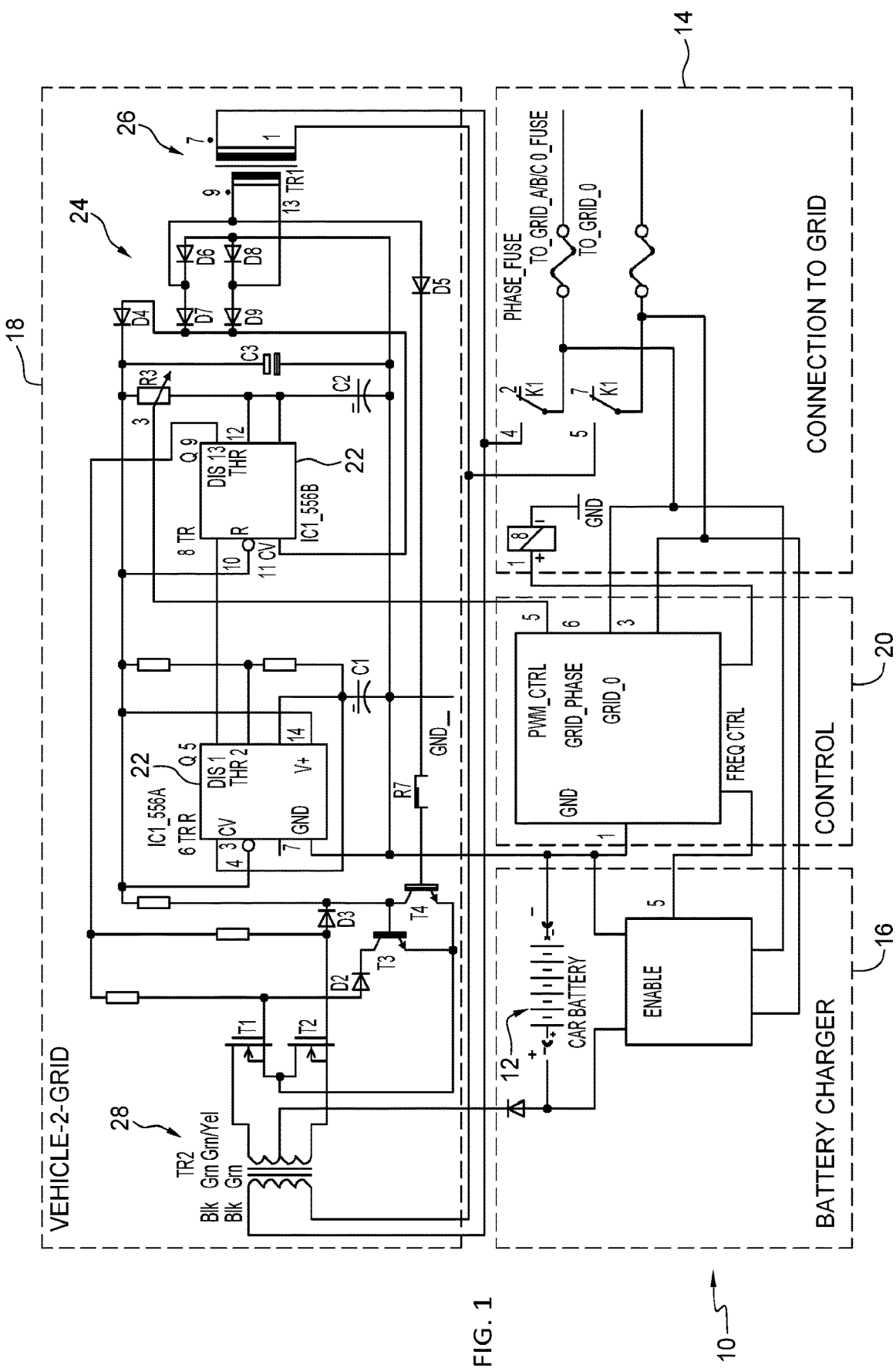
FIG. 1 illustrates a preferred embodiment battery control grid connection system of the invention.

Preferred embodiment methods and systems improve on our prior work discussed in the background of the application. In preferred methods and systems for local battery control of a storage battery, such as PEV battery control, local frequency measurements are made. The measurement provides a control signal that is used to adjust power exchange between individual batteries and the grid. In one embodiment, a simple linear control is implemented to make the battery power output linearly dependent upon frequency deviation. A predetermined ramp limit is set in preferred embodiments. Disturbance can be measured also by local voltage deviations. However, frequency is preferred because voltage is a variable that is associated with reactive (Q) and not real power (P). As such it is not truly indicative of the balance between generation and consumption in the system. While it might provide some benefit, frequency deviation is the preferred measurement to initiate a control change to have a local battery or batteries supply power to the grid. The invention seeks to address disturbances in the power system that related to an imbalance in real power generation and consumption, therefore the most appropriate variable to measure at is the local frequency.

Preferred embodiments are implemented in the charging/control circuits of a storage battery, such as a home battery or a PEV battery. Advantageously, no modifications or monitoring of the power grid is needed. The invention improves grid stability without making any changes to the grid itself and without the need for any additional centralized control or monitoring.

An embodiment of the invention is a method for regulating the power transfer between a PEV or local storage battery, the method comprising measuring the local frequency variation at the battery, controlling the battery to act as a generator to supply power to a connected power grid when a first predetermined frequency deviation in the local frequency is detected, controlling the battery to act as a load to draw power from the connected power grid when a second predetermined frequency deviation in the local frequency is detected and releasing the battery from power regulation control when the local frequency is in a predetermined normal range. Preferred systems of the invention include a charger, battery to grid circuit and controller that regulate a battery to grid connection and switch the battery between load and source under measured local frequency connections to smooth disturbances in the power grid. The charger, battery to grid circuit and controller are integrated into the battery itself or a separate device that connects to the battery. No modification is required to the grid.

Preferred embodiments provide a smart battery charger and battery to grid circuit that controls energy transfers of home batteries (HB) and plug-in electric vehicles (PEV) with the power grid to improve stability. Control is based on local frequency values, which can be measured with a simple and inexpensive peripheral interface controller (PIC controller) that can also be used to regulate the power exchange rate.

Experiments were conducted to test the invention. The experiments regulated the power output of the batteries in accordance with the invention by generating a control signal based upon the measured local frequency. The experiments showed that: frequency and voltage fluctuations following a disturbance are reduced up to 80%; the system takes up to 11 times less time to stabilize; the critical clearing time is extended by 40%; steady-state stability is improved; the region of asymptotical stability expands; and the system becomes more robust overall. The numerical comparisons are made with respect to a case when the batteries are not regulated at all, and only active when charging.

Preferred embodiment systems of the invention include a home or individual commercial building solar system, with an energy battery to store energy for use by the home or commercial entity. The battery includes a controller that controls energy transfers with the power grid.

Preferred embodiments provide a control strategy that regulates power exchange between batteries and the power grid, based on the power frequency value, in an effort to reduce the effects of power system disturbances. A decrease in frequency signals a power shortage, thus batteries are instructed to feed additional power to the grid, in essence acting as small generators. On the other hand, when there is a surplus power in the grid, indicated by increased frequency, the batteries act as loads to consume any excess power. This approach does not require any complex communication infrastructure and expensive metering equipment unlike most smart solutions. Measuring the frequency at a home or commercial building, such as an office, can be accomplished with a small PIC microcontroller that can also be used to govern the power exchange between the battery and the grid.

Regulating the power grid requires HB and PEVs to provide additional power, which reduces the amount of energy available for home use and driving. Fortunately, large disturbances occur rarely, several hundred times per year.

Furthermore, the regulatory actions that follow large disturbances usually last only a few seconds. This means that on average, the normal battery operation will be disturbed for a few seconds per day. Consequently, the effects of power regulation on the vehicle's energy reserves is minimal. Additionally, PEVs are parked and plugged-in 91% of the time and HB are always plugged-in, making them both available for regulatory actions. Having in mind their large number, which is expected to grow, one may expect that many of them will be connected to the grid in the instance with a disturbance and their presence and stored energy may be utilized to help in system stabilization. The batteries used in HB and PEV are very flexible and many modern batteries can react in milliseconds exchanging power with the grid (in both directions) through fast power electronic interfaces.

The invention provides smart local control of home batteries and plug-in electric vehicles, and improves power grid stability using only local frequency values. The use of the present control strategy results in improved steady-state stability, larger region of stability, reduced frequency and voltage fluctuations, faster stabilization and longer critical clearing times.

Control is accomplished locally with a bidirectional charger using only local frequency values thus avoiding the need for a complex communication infrastructure and centralized control. In this way, preferred embodiments eliminate concerns about the network latency, data privacy and security and a whole range of other computer networks' related issues. In addition, the entire control system can be easily implemented using cheap and available components.

The applicability of the preferred control strategy using two power systems from literature: IEEE Case 3, IEEE New England has been demonstrated and is discussed with respect to simulations. The simulations show that power system stability can be improved by smart management of batteries in both steady-state and transient stability. The system becomes more robust with respect to small disturbances and the largest real part of any eigenvalue decreases significantly: in the case of New England it goes from $-0.19 \cdot 10^{-2}$ to $-0.18 \cdot 10^{-4}$, which is a reduction of two orders of magnitude. When large disturbances occur the system parameters like voltage and frequency fluctuate less and take less time to stabilize. Furthermore, the critical clearing time for major faults is longer thus giving more time for automatic prevention mechanisms to react to the fault. We have also shown that the region of stability is larger when batteries are controlled in this manner.

A preferred method for regulating the power transfer between one of more storage batteries and a power grid includes measuring a power characteristic at the one or more storage batteries, and controlling the one or more batteries to selectively act as a generator to supply power to the power grid or to act as a load to draw power from the power grid in response to a predetermined disturbance in the power characteristic being detected.

The method preferably measures local frequency at the one or more storage batteries and the predetermined disturbance comprises a frequency disturbance.

The controlling preferably includes controlling the battery to act as a generator to supply power when a first predetermined frequency deviation in the local frequency is detected, and the controlling the battery to act as a load to draw power from the connected power grid when a second predetermined frequency deviation in the local frequency is detected.

The battery or batteries are preferably released from power regulation control when the local frequency is stable. Release preferably occurs when the frequency disturbance is less than ~0.01-0.05 Hz/s.

The frequency disturbance is preferably determined as a function of the first derivative of the change in local frequency, and preferably exceeds ~0.5-0.1 Hz/s.

The controlling can include controlling the battery or batteries to have a battery power output linearly dependent on frequency deviation, with ramp limits of ±3 kW at ±100 mHz according to:

$$P = \begin{cases} -3 \text{ kW}, & \text{if } \Delta f < -100 \text{ mHz} \\ h \cdot \Delta f \text{ kW}, & \text{if } -100 \text{ mHz} < \Delta f < 100 \text{ mHz} \\ 3 \text{ kW}, & \text{if } \Delta f > 100 \text{ mHz} \end{cases} \quad (1)$$

where h=X kW/Hz is a control parameter and $\Delta f$ is the frequency deviation from its nominal value. In that case, preferably h=~30 kW/Hz.

Control can also include controlling the battery or batteries to have a battery power output dependent upon a tanh, or a sigmoid function, or another monotonically increasing function.

The control can include controlling the battery or batteries to have a battery power output linearly dependent on frequency deviation, with ramp limits of a first predetermined power and a fraction of that power according to:

$$P = \begin{cases} -\text{first predetermined kW}, & \text{if } \Delta f < -\text{fraction mHz} \\ h \text{ kW/Hz} \cdot \Delta f \text{ kW}, & \text{if } -\text{fraction mHz} < \Delta f < \text{fraction mHz} \\ \text{first predetermined kW}, & \text{if } \Delta f > \text{fraction mHz} \end{cases} \quad (1)$$

where h kW/Hz is a control parameter and $\Delta f$ is frequency deviation from its nominal value.

In preferred embodiments, the one or more storage batteries comprises a plug-in electrical vehicle or a home battery.

A preferred system for connecting one or more storage batteries to a power grid includes a battery charging circuit, a battery to grid circuit and a controller that monitors a power characteristic at the one or more storage batteries. The controller controls the one or more batteries to selectively act as a generator to supply power to the power grid or to act as a load to draw power from the power grid in response to a predetermined disturbance in the power characteristic being detected.

The controller can include a frequency counter and state machine. The battery to grid circuit in a preferred system includes a pulse-width modulation signal generator, a grid-tie inverter sub circuit connecting the signal generator with a transformer as its main supply and a referent sine wave generator. The power of the battery to grid circuit depends on the PWM frequency that is regulated by the controller, and a second transformer that powers the battery or batteries and returns power to the power grid.

The power characteristic is preferably a local frequency at the one or more storage batteries and the predetermined disturbance comprises a frequency disturbance.

The controller controls the battery in preferred embodiments to act as a generator to supply power when a first predetermined frequency deviation in the local frequency is detected, and controlling the battery to act as a load to draw power from the connected power grid when a second predetermined frequency deviation in the local frequency is detected, and can release the battery when local frequency is stable.

The frequency disturbance is preferably determined as a function of the first derivative of the change in local frequency, which is preferably ~0.5-0.1 Hz/s. Releasing the battery or batteries is preferably when the frequency disturbance is less than ~0.01-0.05 Hz/s.

The controller can control the battery or batteries to have a battery power output linearly dependent on frequency deviation, with ramp limits of ±3 kW at ±100 mHz according to:

$$P = \begin{cases} -3 \text{ kW}, & \text{if } \Delta f < -100 \text{ mHz} \\ h \cdot \Delta f \text{ kW}, & \text{if } -100 \text{ mHz} < \Delta f < 100 \text{ mHz} \\ 3 \text{ kW}, & \text{if } \Delta f > 100 \text{ mHz} \end{cases} \quad (1)$$

where h=X kW/Hz is a control parameter and Δf is the frequency deviation from its nominal value.

Preferably h=~30 kW/Hz.

The controller can also control the battery or batteries to have a battery power output dependent upon a tanh, or a sigmoid function.

The controller can also control the battery or batteries to have a battery power output linearly dependent on frequency deviation, with ramp limits of a first predetermined power and a fraction of that power according to:

$$P = \begin{cases} -\text{first predetermined kW}, & \text{if } \Delta f < -\text{fraction mHz} \\ h \text{ kW/Hz} \cdot \Delta f \text{ kW}, & \text{if } -\text{fraction mHz} < \Delta f < \text{fraction mHz} \\ \text{first predetermined kW}, & \text{if } \Delta f > \text{fraction mHz} \end{cases} \quad (1)$$

where h kW/Hz is a control parameter and Δf is frequency deviation from its nominal value.

The one or more storage batteries can be a plug-in electrical vehicle or a home battery, and the system can be integrated into a battery controller or a module that connects between the battery and the grid.

Preferred embodiments of the invention will now be discussed with respect to the drawings and with respect to experiments that have demonstrated preferred embodiments of the invention. The drawings may include schematic representations, which will be understood by artisans in view of the general knowledge in the art and the description that follows. Features may be exaggerated in the drawings for emphasis, and features may not be to scale. Artisans will appreciate broader aspects of the invention from the following discussion of experiments and specific embodiments.

FIG. 1 illustrates a preferred system 10 of the invention that connects a battery or batteries 12 to the power grid. The system 10 is consistent with an experimental embodiment. Control method of the invention are broader and can function in systems other than the example system 10, as will be appreciated by artisans. In a preferred embodiment of the system 10, the battery or batteries 12 is/are a PEV battery. A PEV battery is, in essence, a general battery having a large storage capacity. It is therefore no different in the context of the present system 10 than a home battery (HB) or other large battery used, for example, to store energy received from a renewable energy source such as a solar panel, wind mill, hydroelectric system, regenerative braking system, etc.; or as a back-up storage unit to provide power when grid power is interrupted. The remainder of the system 10 is independent of the type of battery or batteries 12. By large storage capacity, what is meant is a battery that can power at least part of a home or business power need when charged. Home batteries are available with as small as about 2.2 kWh of storage capacity, which is a unit that is intended to be used with additional units. Such a unit is offered by a small company called Orison, which offers small units that can be installed simply by plugging into an ordinary electrical socket. The battery or batteries 12 also need not be a single battery, but can be a system of batteries, such as plural small home batteries intended to be used together. Another example home battery is offered by Tesla and is called the Powerwall. This battery has a 6.4 kWh energy storage capacity, which is stated to be sufficient to power most homes during the evening using electricity generated by solar panels during the day. This battery also permits multiple batteries to be installed together to provide more storage capacity. The storage capacities of typical PEV batteries are higher, with commercially available all electric vehicles ranging from a capacity of about 24 kWh to 90 kWh. Multiple PEV batteries may also be present at location, such as multiple PEVs at one household or multiple PEVs at a public charging station.

The system 10 connects to a grid connection circuit 14 and acts as a battery-to-grid (B2G) extended battery charger. The grid connection circuit 14 is conventional switched and fused connection. The three primary sub circuits of the system include a battery charger 16, a battery to grid circuit 18 and a controller 20 that adjusts battery to grid circuit power to a frequency deviation. The battery charge 16 can be conventional. The battery to grid circuit 18 includes functions of DC to AC and AC to DC conversion, and such functions can be realized with conventional circuits. The invention adds and uses a local frequency measurement to decide to switch the battery or batteries 12 between load and source, and the controller 20 directs such switching.

The controller 20 can be realized with a number of different circuit implementations. One example implementation is a simple frequency counter (such as ICM72161) combined with a custom finite state machine. Another option is a powerful smart general purpose computer, which offers the opportunity to provide a web configuration and control interface. The primary function of the controller 20 is to continuously (or via frequent sample) measure the frequency deviation and switch on/off the charger (via G2B signal) or the inverter (via B2G signal). It will also regulate the battery to grid circuit's 18 output power based on the measured frequency deviation.

The example battery to grid circuit 18 includes a dual timer circuit chip (IC556 (two IC555 placed on a single chip) as a pulse-width modulation (PWM) signal generator 22. A grid-tie inverter circuit 24 connects the signal generator 22 with a transformer 26 TR1 as its main supply and a referent sine wave generator. The power of the battery to grid circuit 18 power depends on the PWM frequency of the signal generator 22 and its high level duration, which is regulated with the resistance of a resistor R3 by the controller 20. The controller in preferred embodiments makes the following decisions:

During the load phase, the battery charger 16 is enabled.

During the power phase, the vehicle to grid circuit 18 circuit is enabled. TR1 is used to align the battery to grid frequency with the power grid frequency, whereas transistor 28 TR2 injects the power from the battery to the grid. The generated power is returned to the GRID via another transformer 28 TR2. The physical characteristics of the resistors, capacitors, diodes and MOSFETs as well as the PWM signal control itself may vary with the required power in a specific battery to grid charger.

Figure 2:
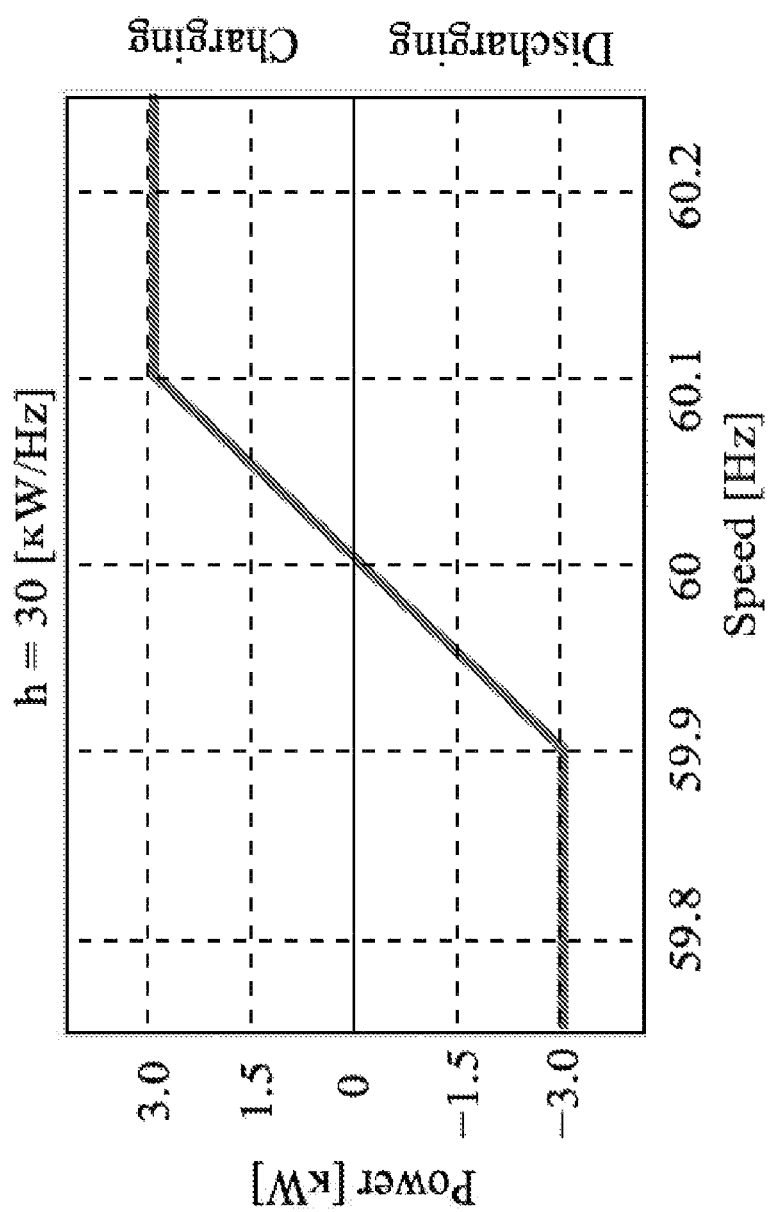
FIG. 2 illustrates a preferred embodiment linear control strategy executed by a controller in the FIG. 1 system.

FIG. 2 illustrates a preferred example linear control strategy employed by the controller 20 that allows the battery or batteries 12 to behave as a generator in a first frequency range, e.g., f<60 Hz (nominal or referent frequency), or as a load in a second frequency range, e.g., f>60 Hz (nominal or referent frequency). The US frequency of 60 Hz is used as an example nominal or referent frequency, while such frequency varies in other parts of the world, such as 50 Hz in Europe. The measurement includes some predetermined threshold tolerance, in this example 0.1 Hz, to avoid switching too quickly. This predetermined threshold is set with consideration of avoiding too rapid changes with a second threshold. For example, a second threshold regarding the speed of change of the frequency $d(\Delta f)/dt$>0.05 Hz/s is preferably used to avoid switching too quickly.

The controller 20 also sets the amount of power provided by the battery or batteries 12. An example linear control strategy executed by the controller 20 has battery power output linearly dependent on frequency deviation, with ramp limits of ±3 kW at ±100 mHz (as represented by the ramp in FIG. 2) is defined as $$P = \begin{cases} -3 \text{ kW}, & \text{if } \Delta f < -100 \text{ mHz} \\ h \cdot \Delta f \text{ kW}, & \text{if } -100 \text{ mHz} < \Delta f < 100 \text{ mHz} \\ 3 \text{ kW}, & \text{if } \Delta f > 100 \text{ mHz} \end{cases} \quad (1)$$

where h=30 kW/Hz is a control parameter and $\Delta f$ is the frequency deviation from its nominal value. The choice of function for the control is arbitrary, and not limited to the example ramp control. A limiting factor is the max power that can be transferred from the battery or batteries, e.g., 3 kW or 5 kW. Apart from that the shape of the function, other preferred strategies include any control that is monotonically increasing. One alternative would be to use tanh, or a sigmoid function. Performance in terms of system stability will be very comparable to the linear control case.

The preferred control strategy is employed only when a disturbance in the system is detected, otherwise, the power does not follow equation (1), and the battery or batteries 12 act as constant load of predetermined value (e.g. 3 kW) or as a constant source (e.g. −3 kW). The battery or batteries 12 are therefore released from control. When released from control, the battery or batteries 12 can be charging or plugged in and not charging—thus not consuming any power. Batteries are often a mode where they are nor charging nor discharging, they are just plugged-in The power frequency is never constant and even under normal operation it fluctuates around its nominal value due to the power demand fluctuations, which is a well know phenomena in the field of steady-state stability. For this reason preferred embodiments use $d(\Delta f)/dt$ i.e. the first derivative of $\Delta f$, as an indication that there is significant disturbance in the system. A disturbance which causes frequency deviation with a rate of a predetermined value, e.g., 0.1 Hz/s, or more acts as a trigger signal that forces the battery or batteries 12 to follow the preferred control strategy. Preferred embodiments use a predetermined frequency deviation ~0.05-0.1 Hz/s. Another trigger signal is generated when the disturbance subsides, that is in the moment when and $d(\Delta f)/dt$ are below a second predetermined threshold (e.g., $d(\Delta f)/dt$=0.05 Hz/s), at which point that frequency is considered stable. The second predetermined threshold is preferably ~0.01-0.05 Hz/s, and lower thresholds make the battery or batteries act as a source for longer than higher thresholds. The second trigger signal puts the batteries into "sleep mode" and they stop following equation (1). This permits the batteries to charge or be plugged-in without charging according to conventional control.

Experimental Simulation

Figure 3B:
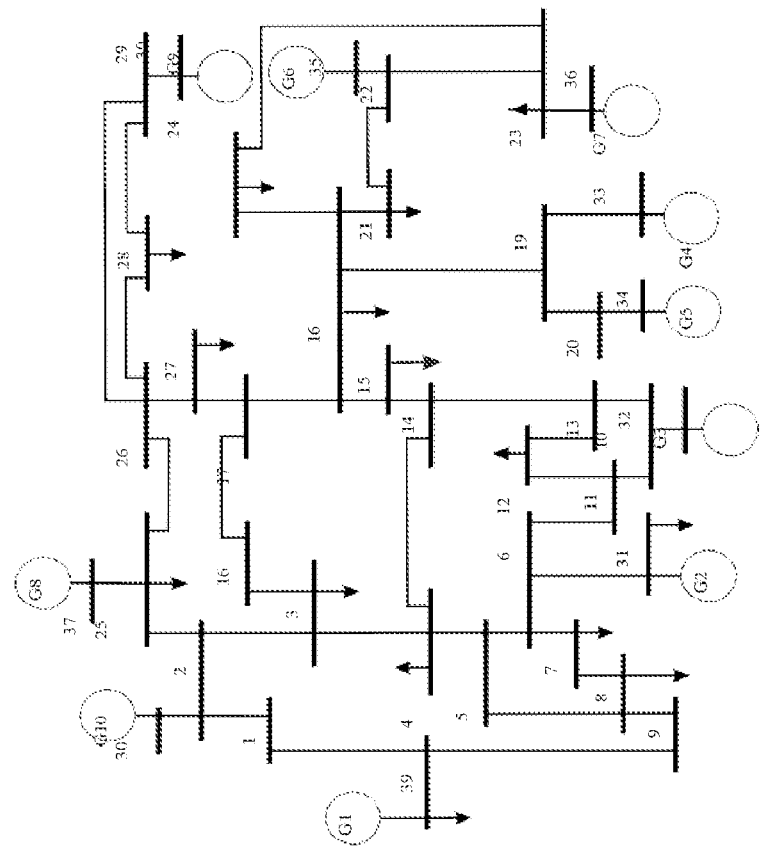
FIG. 3A shows the IEEE Case 3 model used to simulate performance of the invention and FIG. 3B shows the IEEE New England model used in performance simulations.
Figure 3A:
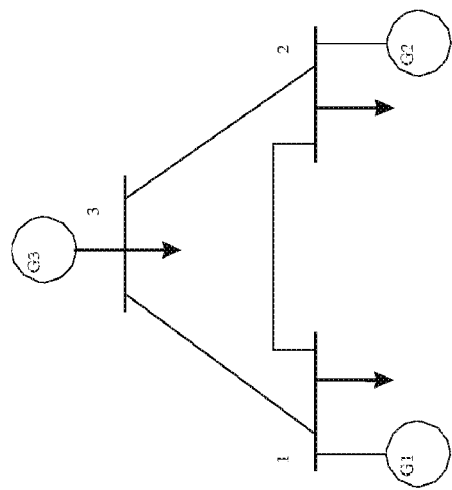

The preferred control strategy consistent with equation (1) and FIG. 2 was simulated with a software tool for dynamic simulation of power system, PSS/E developed by Siemens. A dynamic model of smart batteries suitable for PSS/E was developed and a full power system simulation in Matlab was conducted that included all essential components. The preferred control strategy was simulated using simulations on models based on real power systems as detailed below. The systems tested were IEEE Case 3, IEEE New England, which are published systems. See, T. Athay, R. Podmore, and S. Virmani, "A practical method for the direct analysis of transient stability," *Power Apparatus and Systems, IEEE Transactions on*, no. 2, pp. 573-584, 1979; M. Pai, *Energy function analysis for power system stability*. Springer, 1989. FIG. 3A shows the IEEE Case 3 model. FIG. 3B shows the IEEE New England model.

System Model

The dynamic behavior of a power system is described by a set of first order differential equations with generators' rotor angle and speed taken as state variables. With these equations, for each generator, we are modeling the mechanical oscillations due to the power imbalance defined as a difference between generator input and output. Generator input is equal to the turbine mechanical power, while generator output depends on the conditions in the transmission network and it is equal to the electric power injected in the network. The latter, depends on the characteristics of the network, voltage levels, load demand and generator electrical characteristics (transient reactance and electromotive force).

Transient reactances and electromotive forces of generators are included in the network model. All network elements (transmission lines and transformers) are modelled by their π-equivalents circuits, while consumers are modelled by power injection which are often replaced by a constant nodal shunt admittance. The resulting network model is described by the bus admittance matrix, while the relation between voltages and currents is given by the nodal admittance equation.

Consider a power system with N buses of which n are generator buses and m are load buses. We assume that every load bus also has some batteries connected to it and aggregate them together in an autonomous battery group (ABG) to facilitate modeling. Each load is modeled as a passive admittance.

The power equations at each load bus are $$0 = V_i^2 G_{i0} + \Sigma_k^N V_i V_k (G_{ik} \cos(\delta_i - \delta_k) - B_{ik} \sin(\delta_i - \delta_k)) + P_i^{ABG}$$

$$0 = -V_i^2 B_{i0} + \Sigma_k^N V_i V_k (G_{ik} \sin(\delta_i - \delta_k) - B_{ik} \cos(\delta_i - \delta_k)) \quad (2)$$

where $G_{ik}$ and $B_{ik}$ are real and imaginary part of the corresponding element of bus admittance matrix, $Y_{ik} = G_{ik} + jB_{ik}$; $V_i$ and $\delta_i$ are the voltage magnitude and angle at ith bus $\underline{V_i} = V_i e^{j\delta_i}$; and $P^{ABG}$ is the injected active power by batteries at the ith bus.

The generators are modeled as a constant electromotive force behind a transient reactance, and their dynamics are described by the swing equation.

$$\dot{\delta} = \omega_i \quad (3)$$

$$\dot{\omega} = \frac{1}{M_i}\left[-D_i\omega_i + P_i^m - \sum_k^N V_i V_k (G_{ik}\cos(\delta_i - \delta_k) - B_{ik}\sin(\delta_i - \delta_k))\right]$$

where $\delta_i$ is the generator angle; $\omega_i$ is the generator speed; $M_i$ is the rotor inertia constant; $D_i$ is the damping coefficient; and $P_i^m$ is the mechanical power driving the generator turbine. In a sense this model resembles the "structure preserving model" with simple passive loads and an added term for the PEVs and HBs. See, e.g., T. Van Cutsem and M. Ribbens-Pavella, "Structure preserving direct methods for transient stability analysis of power systems," in *Decision and Control, 1985 24th IEEE Conference on*, vol. 24, pp. 70-76, IEEE, 1985.

The power $P_i^{ABG}$ is the aggregate effect of all electric vehicles and home batteries at ith bus and is analogous to the power exchange with a battery and also peaks when the frequency deviation reaches ±100 mHz.

$$P_i^{ABG} = \begin{cases} -0.1 \cdot h_i \text{ MW}, & \text{if } \Delta f_i \leq -0.1 \text{ Hz} \\ \Delta f_i \cdot h_i \text{ MW}, & \text{if } -0.1 \text{ Hz} < \Delta f_i \leq 0.1 \text{ Hz} \\ 0.1 \cdot h_i \text{ MW}, & \text{if } \Delta f_i > 0.1 \text{ Hz} \end{cases}$$

where $h_i$ is a control parameter and $\Delta f_i = \Delta \omega_i/2\pi$ is the frequency deviation at $i_{th}$ bus. In order to reduce the number of control parameters we take them to be proportional to the load consumption at that bus i.e., $$h_i = h \frac{P_i}{\sum_{k=1}^{N} P_k}$$

A goal of the simulation was to measure how different parameters for the control parameter h affect system stability.

Steady State Stability

A power system is steady state stable if it is able to reach a new stable configuration following a small disturbance in the system. Such disturbances are continuously present in normal system operation and they include load fluctuation, actions of automatic voltage regulators or switching operations of less important system elements. In other words, steady state stability applies to system events under which there are very gradual and infinitesimally small power changes. The new stable state is very close to the pre-disturbance operating point. In such cases the equations describing the power system dynamics may be linearized for analytical purposes.

It is well known that a system is steady-state stable if the Jacobian matrix, obtained in the process of equation linearization using Taylor series, has only eigenvalues with negative real parts. See, P. Sauer and M. Pai, "Power system steady-state stability and the load-flow Jacobean," *Power Systems, IEEE Transactions on*, vol. 5, no. 4, pp. 1374-1383, 1990. Furthermore, the largest real part of any eigenvalue, denoted with α, of the Jacobian matrix also serves as an indicator of the overall system stability. J. Doyle, "Analysis of feedback systems with structured uncertain-ties," in *Control Theory and Applications, IEEE Proceedings D*, vol. 129, pp. 242-250, IET, 1982; G. Becker and A. Packard, "Robust performance of linear parametrically varying systems using parametrically-dependent linear feedback," *Systems & Control Letters*, vol. 23, no. 3, pp. 205-215, 1994. This therefore presents a model to test the stability of power systems with and without the invention applied.

Transient Stability

Power systems may experience severe disturbances which include: short circuits with or without significant network topology change, switching operations of important lines/transformers and sudden application or removal of big load. Transient stability of a power system refers to the ability of the system to reach a stable condition following any large disturbance in the transmission network. In these cases the right hand sides of (2) and (3) undergo significant changes for two reasons: 1) there are large excursions of generator rotor angles and the power-angle relationship has to be taken in its original nonlinear form, 2) there are large changes in the coefficients Gij and Bij due to bus admittance matrix changes which are substantial. In these situations, the new stable state may be very different from the pre-disturbance operating state and equation linearization is not applicable. In transient simulations we identify three stages: 1) pre-fault stage, 2) fault stage and 3) post-fault stage.

During the pre-fault stage the system is in equilibrium and the state variables are constant. Then at $t=t_0$ a fault occurs that changes the system topology, thus changing the admittance matrix which in turn cancels the balance between consumption and production the system state variables begin to deviate. At $t=t_{cl}$ the fault is cleared and the admittance matrix returns to its pre-fault state. The initial conditions for the post fault stage are the system parameters at $t_{cl}$. Depending on these initial values the system will either return to stable operation or lose synchronization.

In transient stability analysis it is important to determine if the system will return to stable operation after a fault has been cleared. This is greatly facilitated if one knows the region of asymptotical stability (RAS) which is defined as the largest region in parameter space for which the system state converges to equilibrium. If we know the RAS, then we can determine whether the system will remain stable for a given initial conditions just by checking if those conditions lie inside the specified region. Consequently, a larger RAS means that the system is more stable and can handle more severe disturbances.

Figures 4A, 4B:
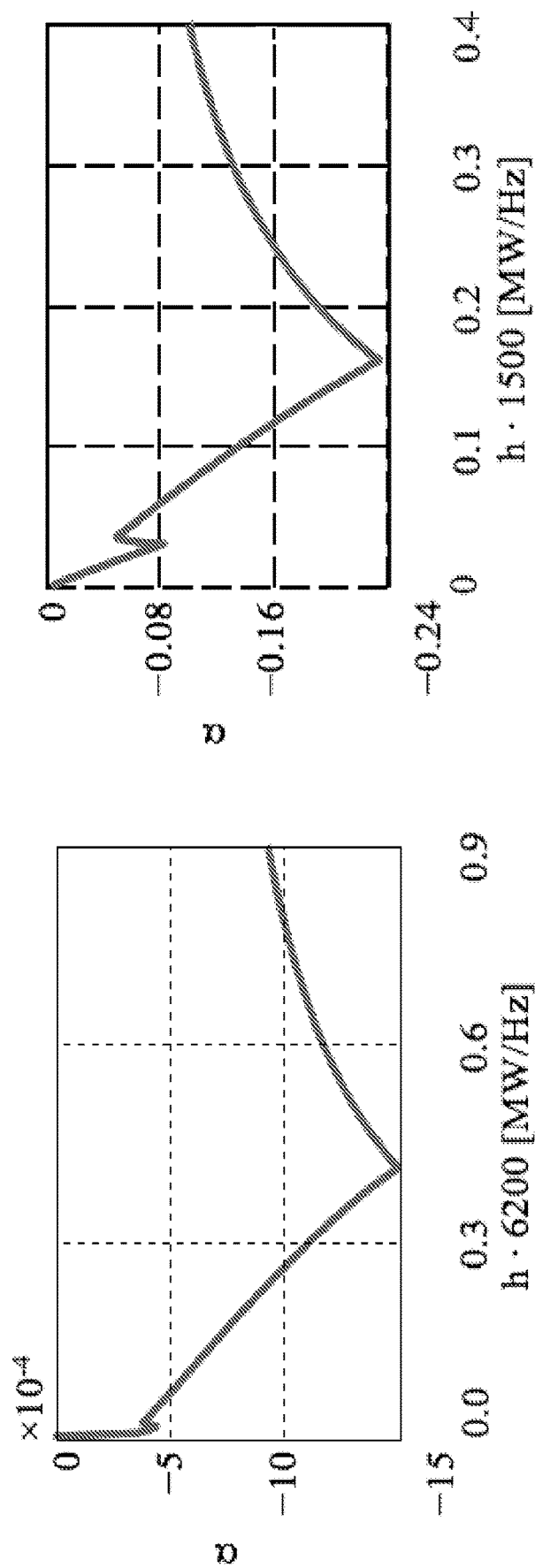
FIGS. 4A and 4B are receptive simulation data concerning steady stability as a function of a control parameter for the IEEE Case 3 and IEEE New England models.
Figure 5:
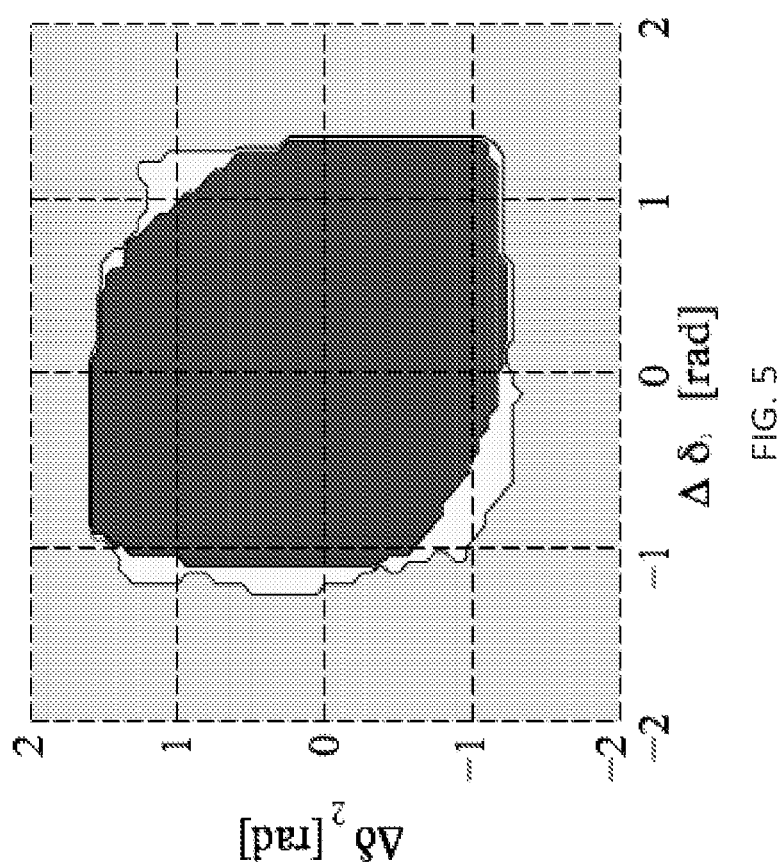
FIG. 5 illustrates a comparison of the region of asymptotical stability for the IEEE Case 3 system with and without the battery grid control of the invention applied.

Simulation result data is included in FIGS. 4A-7F. In FIGS. 4A and 4B show the stability indicator a as a function of the control parameter h. Minimums are observed at h=0.4 for IEEE New England and at h=0.17 for IEEE Case 3. The control parameter values are scaled proportionally to the total consumption of the power system (6200 MW New England and 1500 MW for case 3). FIG. 5 shows that the invention (lager area) expands the region of asymptotical stability (RAS) for IEEE Case 3 power system. The stable region for the standard power system is substantially expanded with the invention. FIG. 6A shows the critical clearing time for three-phase short circuits averaged for all buses for the invention applied to IEEE New England 39 bus power system with varying values for h. Specifically, we simulated a three phase short circuit at different buses in the IEEE New England 39 bus power system. For each such simulation we found the critical clearing time (CCT). We then added our battery control scheme to the system with varying battery capacities, and ran the simulations again to calculate the new CCT.

Figures 6A, 6B:
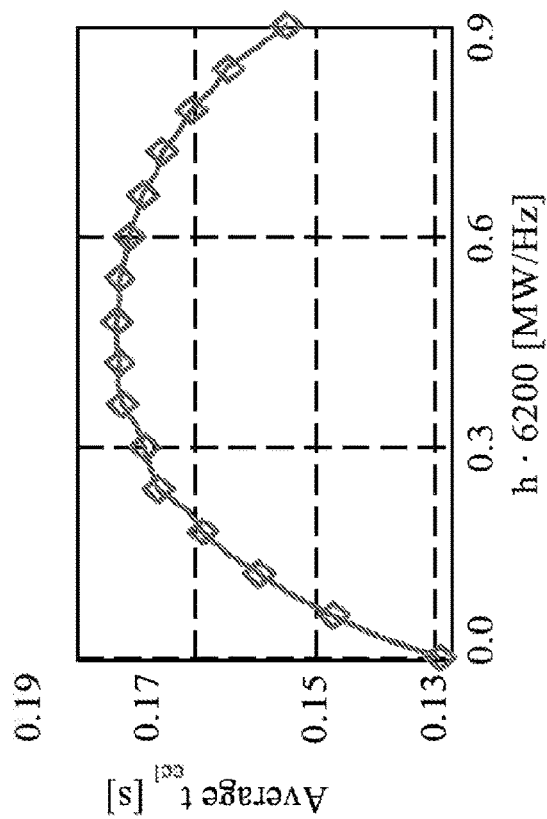
FIG. 6A is data illustrating the critical clearing time for three-phase short circuits averaged for all buses with a simulation of a preferred embodiment.
FIG. 6B is data of critical clearing times for different bus faults and various control constants for an example case simulated for the IEEE New England 39 bus power system.
Figures 7A, 7B:
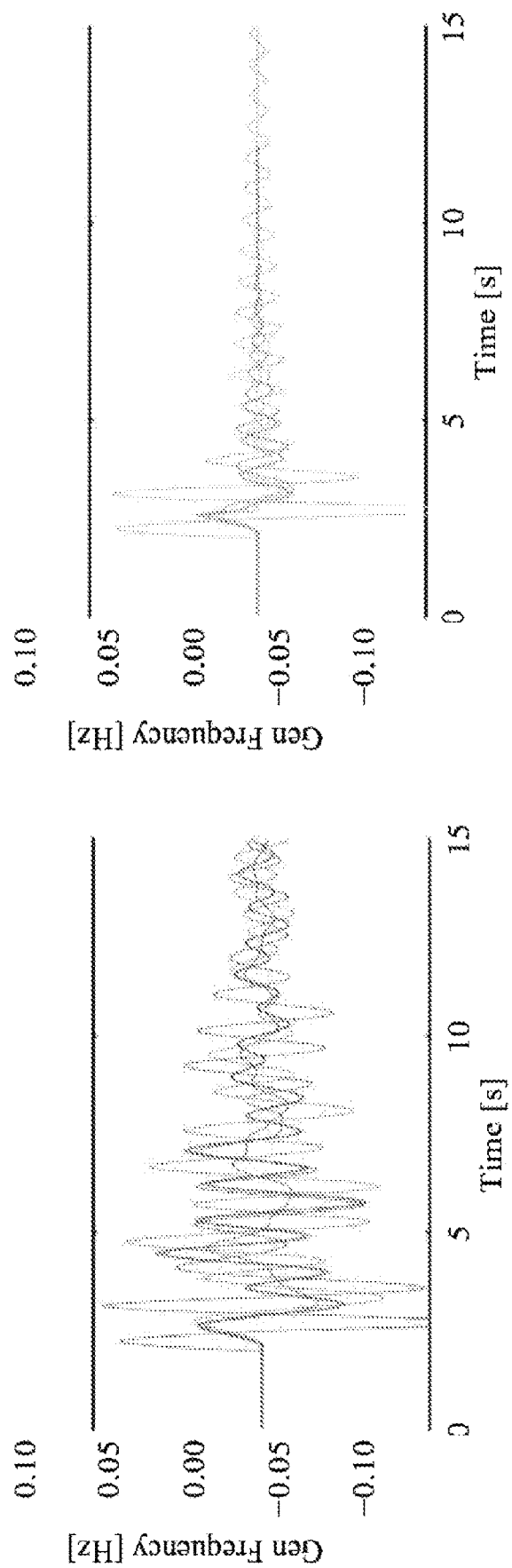
FIGS. 7A and 7B respectively compare generator frequencies that result from a branch trip (5-6) that starts at 2 [s] and lasts 0.5 [s] without and with the invention applied.
Figure 7C:
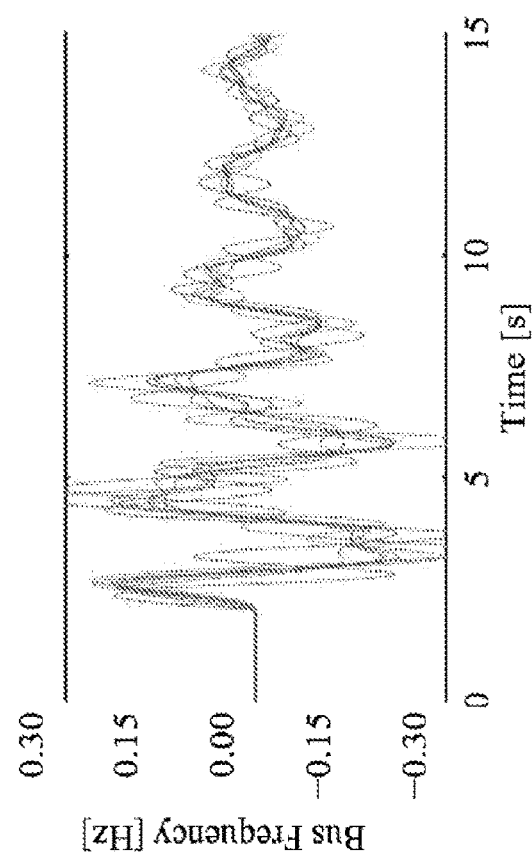
FIGS. 7C and 7D respectively compare bus frequencies that result from a branch trip (5-6) that starts at 2 [s] and lasts 0.5 [s] without and with the invention applied.
Figure 7D:
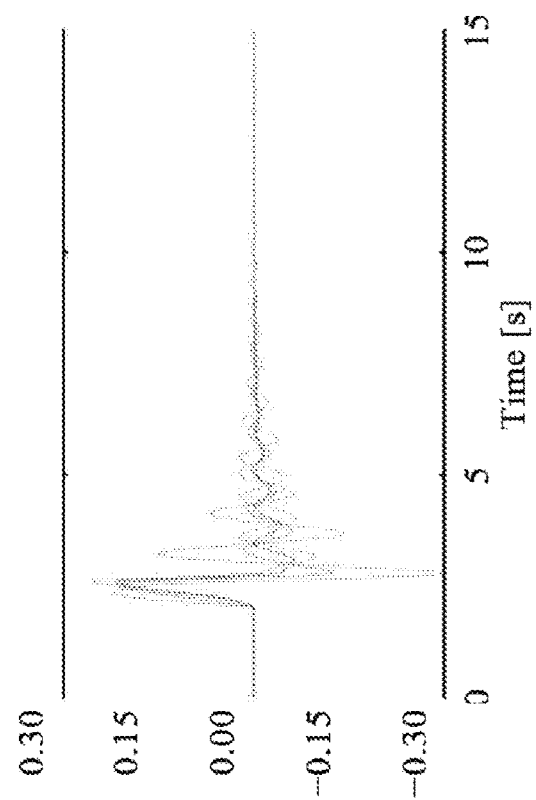
Figures 7E, 7F:
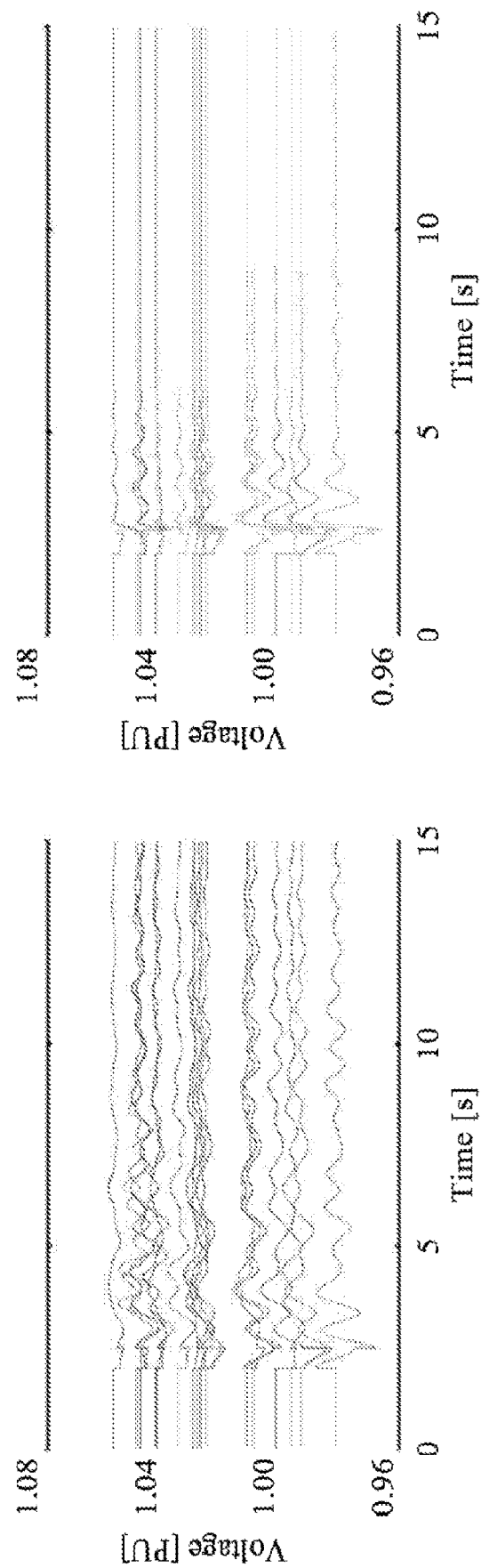
FIGS. 7E and 7F respectively compare system voltages that result from a branch trip (5-6) that starts at 2 [s] and lasts 0.5 [s] without and with the invention applied.

The results show that for all realistic battery capacities (<50% of the total generation in the system) CCT are longer when this control scheme is active. In fact, the more battery capacity you have the longer the CCT get FIG. 6B is a table of data with critical clearing times for different bus faults and various control constants for the IEEE New England 39 case. FIGS. 7A-7F compare generator frequencies (FIGS. 7A and 7B), bus frequencies (FIGS. 7C and 7D) and system voltages (FIGS. 7E and 7F) that result from a branch trip (5-6) that start at 2 [s] and lasts 0.5 [s]. The deviation is damped out faster with the invention applied with PEVs that are used h=5*6200 [MW/Hz] (FIGS. 7B, 7D and 7F) as opposed to the standard system without the invention applied to leverage PEVs (FIGS. 7A, 7C, 7E). The value h depends only on the number of PEVs and HBs available for regulation. We assumed in 0048-49 that a single PEV/HB can support 30 kW/Hz. Therefore to achieve 5*6200 [MW/Hz] there would need to be around 103 000 PEV and HB present in the system, which is a realistic scenario. Even if we exclude HB and only consider PEVs that is still less than 5% of the total number of vehicles in New England.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for regulating the power transfer between one or more storage batteries and a power grid, the method comprising locally measuring a power characteristic at the one or more storage batteries, and locally controlling the one or more batteries to selectively act as a generator to supply power to the power grid or to act as a load to draw power from the power grid in response to a predetermined disturbance in the power characteristic being detected.

2. The method of claim 1, wherein the power characteristic comprises a local frequency at the one or more storage batteries and the predetermined disturbance comprises a frequency disturbance.

3. The method of claim 2, wherein the controlling comprises controlling the battery to act as a generator to supply power when a first predetermined frequency deviation in the local frequency is detected, and the controlling the battery to act as a load to draw power from the connected power grid when a second predetermined frequency deviation in the local frequency is detected.

4. The method of claim 2, further comprising locally releasing the battery or batteries from power regulation control when the local frequency is stable.

5. The method of claim 2, wherein the frequency disturbance is determined as a function of the first derivative of the change in local frequency.

6. The method of claim 2, wherein the controlling comprises controlling the battery or batteries to have a battery power output linearly dependent on frequency deviation, with ramp limits of ±3 kW at ±100 mHz according to:

$$P = \begin{cases} -3 \text{ kW,} & \text{if } \Delta f < -100 \text{ mHz} \\ h \cdot \Delta f \text{ kW,} & \text{if } -100 \text{ mHz} < \Delta f < 100 \text{ mHz} \\ 3 \text{ kW,} & \text{if } \Delta f > 100 \text{ mHz} \end{cases} \quad (1)$$

where h=X kW/Hz is a control parameter and Δf is the frequency deviation from its nominal value, and wherein h=~30 kW/Hz.

7. The method of claim 2, wherein said controlling comprises controlling the battery or batteries to have a battery power output dependent upon a tanh, or a sigmoid function.

8. The method of claim 2, wherein the controlling comprises controlling the battery or batteries to have a battery power output linearly dependent on frequency deviation, with ramp limits of a first predetermined power and a fraction of that power according to:

$$P = \begin{cases} -\text{first predetermined kW,} & \text{if } \Delta f < -\text{fraction mHz} \\ h \text{ kW/Hz} \cdot \Delta f \text{ kW,} & \text{if } -\text{fraction mHz} < \Delta f < \text{fraction mHz} \\ \text{first predetermined kW,} & \text{if } \Delta f > \text{fraction mHz} \end{cases} \quad (1)$$

where h kW/Hz is a control parameter and Δf is frequency deviation from its nominal value.

9. The method of claim 8, wherein the one or more storage batteries comprises a plug-in electrical vehicle or a home battery.

10. A system for connecting one or more storage batteries to a power grid, the system comprising a battery to grid circuit and a local controller that monitors a power characteristic at the one or more storage batteries, and controls the one or more batteries to selectively act as a generator to supply power to the power grid or to act as a load to draw power from the power grid in response to a predetermined disturbance in the power characteristic being detected, wherein the controller comprises a battery charging circuit that controls the battery to act as a generator to supply power when a first predetermined frequency deviation in the local frequency is detected, and controls the battery to act as a load to draw power from the connected power grid when a second predetermined frequency deviation in the local frequency is detected.

11. The system of claim 10, wherein the battery to grid circuit comprises a pulse-width modulation signal generator, a grid-tie inverter sub circuit connecting the signal generator with a transformer as its main supply and a referent sine wave generator, the power of the battery to grid circuit depends on the PWM frequency that is regulated by the controller, and a second transformer that powers the battery or batteries and returns power to the power grid.

12. The system of claim 10, wherein the power characteristic comprises a local frequency at the one or more storage batteries and the predetermined disturbance comprises a frequency disturbance.

13. The system of claim 12, further comprising releasing the battery or batteries from power regulation control when the local frequency is stable.

14. The system of claim 12, wherein the frequency disturbance is determined as a function of the first derivative of the change in local frequency.

15. The system of claim 12, wherein the controlling comprises controlling the battery or batteries to have a battery power output linearly dependent on frequency deviation, with ramp limits of ±3 kW at ±100 mHz according to:

$$P = \begin{cases} -3 \text{ kW}, & \text{if } \Delta f < -100 \text{ mHz} \\ h \cdot \Delta f \text{ kW}, & \text{if } -100 \text{ mHz} < \Delta f < 100 \text{ mHz} \\ 3 \text{ kW}, & \text{if } \Delta f > 100 \text{ mHz} \end{cases} \quad (1)$$

where h=X kW/Hz is a control parameter and Δf is the frequency deviation from its nominal value, h=~30 kW/Hz.

16. The system of claim 12, wherein said controlling comprises controlling the battery or batteries to have a battery power output dependent upon a tanh, or a sigmoid function.

17. The system of claim 12, wherein the controlling comprises controlling the battery or batteries to have a battery power output linearly dependent on frequency deviation, with ramp limits of a first predetermined power and a fraction of that power according to:

$$P = \begin{cases} -\text{first predetermined kW}, & \text{if } \Delta f < -\text{fraction mHz} \\ h \text{ kW/Hz} \cdot \Delta f \text{ kW}, & \text{if } -\text{fraction mHz} < \Delta f < \text{fraction mHz} \\ \text{first predetermined kW}, & \text{if } \Delta f > \text{fraction mHz} \end{cases} \quad (1)$$

where h kW/Hz is a control parameter and Δf is frequency deviation from its nominal value.

18. The system of claim 17, further comprising releasing the battery or batteries from power regulation control when the local frequency is stable.

19. The system of claim 10, wherein the one or more storage batteries comprises a plug-in electrical vehicle or a home battery.

* * * * *